3,801,563
NOVEL DIPEPTIDE ESTERS CONTAINING
L-ASPARTIC ACID
Nobuo Nakajima, Nishinomiya, Hisashi Aoki, Suita, Masahiko Fujino, Takarazuka, Osamu Nishimura, Toyonaka, Mitsuhiro Wakimasu, Suita, and Mitsuhiko Mano, Settsu, Japan, assignors to Takeda Chemical Industries, Ltd., Osaka, Japan
No Drawing. Filed Dec. 6, 1971, Ser. No. 205,419
Claims priority, application Japan, Dec. 5, 1970, 45/107,880; Dec. 18, 1970, 45/114,586; Aug. 26, 1971, 46/65,358
Int. Cl. C07c *103/52*
U.S. Cl. 260—112.5                                 5 Claims

---

ABSTRACT OF THE DISCLOSURE

A dipeptide ester is provided herein of the general formula:

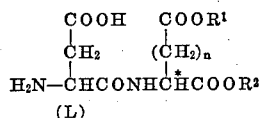
(L)

wherein $R^1$ is a branched or cyclic alkyl group of 3 to 8 carbon atoms, $R^2$ is a lower alkyl group of 1 to 2 carbon atoms, $n$ is an integer 0 or 1 and C* represents that the radicals attached to the carbon atom show an L-configuration when $n$ is 1. The present invention is also directed to methods of producing the aforementioned esters. These compounds have excellent utility as sweeteners for food, being free from an objectionable after-taste and having a quality of sweetness comparable to sucrose.

---

The present invention relates to novel dipeptide ester compounds which are of value, for example, as sweeteners for foods as well as to method for producing such sweeteners.

It has now been found by the present inventors that dipeptide esters of the general Formula I:

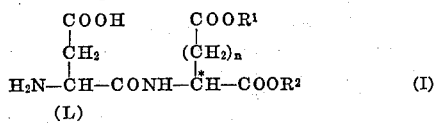                                (I)
(L)

wherein $R^1$ is a branched or cyclic alkyl group of 3 to 8 carbon atoms, $R^2$ is a lower alkyl group of 1 to 2 carbon atoms, $n$ is an integer 0 or 1 and C* represents that the radicals attached to the carbon atoms show an L configuration when $n$ is 1, all of these compounds being novel compounds, have an excellent ability for sweetening foods.

It is an object of the present invention to provide the novel dipeptide ester compounds.

Another object of the present invention is to provide foods sweetened by the use of the peptide ester compounds.

A further object of the present invention is to provide sweetening compositions prepared from the dipeptide ester compounds.

A further object of the present invention is to provide industrially advantageous method for the production of the novel dipeptide ester compounds.

A further object of the present invention is to provide a practical method for producing the sweetened foods.

The novel dipeptide ester compounds of the present invention are produced in the following ways.

(1) A method, which comprises condensing an L-aspartic acid derivative represented by the general Formula II:

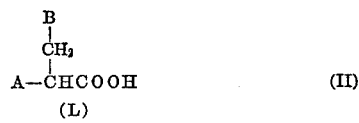       (II)
(L)

wherein A is a protected amino group and B is a protected carboxyl group with a compound represented by the general Formula III:

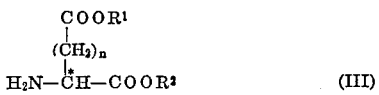       (III)

wherein each of $R^1$, $R^2$, $n$ and C* has the same meaning as defined above, to produce a dipeptide ester derivative represented by the general Formula IV:

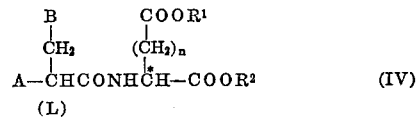       (IV)
(L)

wherein each of A, B, $R^1$, $R^2$ and $n$ has the same meaning as defined above, and removing the protecting groups from the dipeptide ester derivative (IV).

(2) A method, which comprises reacting 2,5-oxazolidinedione-4-acetic acid of the Formula V

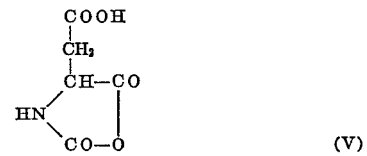       (V)

with the above mentioned compound of the general Formula III.

The raw materials, i.e. the Compounds II and III, include known compounds as well as novel compounds. The novel compounds are easily prepared in the similar manner as known methods. For example, the compound of the general Formula III wherein $n$ is 0 is prepared by esterifying malonic acid, hydrolyzing thus produced malonic acid diester represented by the formula:

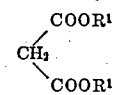

wherein $R^1$ has the same meaning as defined above, in the presence of sodium hydroxide to produce a half ester of the formula:

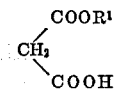

wherein $R^1$ has the same meaning as defined above, esterifying the half ester to produce a diester compound of the formula:

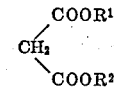

wherein $R^1$ and $R^2$ have the same meaning as defined above, reacting thus obtained diester compound with sodium nitrite in the presence of acetic acid, and reducing the reaction product by a catalytic hydrogenation in the presence of palladium black.

Referring to general Formulas II and IV, the protected amino group A is a group which will ultimately be converted to an amino group upon removal of the protective group. There have been established a number of such protected amino groups in the field of peptide synthesis and such a group can be conveniently utilized in the processes of this invention. However, from the standpoint of economy and ease of processing, a benzyloxycarbonyl-amino group is most desirable.

As regards the protected carboxyl group B in the general Formulas II and IV, a suitable group may likewise be selected from the class of a number of established groups. Among such groups, benzyloxycarbonyl (i.e., $$-COOCH_2C_6H_5)$$

is a preferred example.

The branched or cyclic alkyl group of 3 to 8 carbon atoms represented by $R^1$ is exemplified by i-propyl, t-butyl, 1-ethylpropyl, cyclopentyl, methylated cyclopentyl (e.g., 2-methylcyclopentyl, 2,5-dimethylcyclopentyl, etc.), cyclohexyl, methylated cyclohexyl (e.g., 2-methylcyclohexyl, 2,6-dimethylcyclohexyl, etc.) and the like. The lower alkyl group represented by $R^2$ is methyl or ethyl.

The condensation according to method (1) may also be carried out by the techniques established for the condensation of a compound having a carboxyl group and a compound having an amino group. Thus, the technique of reacting a compound of the general Formula II with a compound of the general Formula III in the presence of a dehydrating agent such as dicyclohexylcarbodiimide and the technique which comprises converting a compound of the general Formula II to the corresponding reactive derivative such as pentachlorophenyl ester or acid chloride and, then, reacting the derivative with a compound of the general Formula III may be mentioned by way of example. While the reaction generally proceeds at room temperature, it may be carried out under cooling or heating in a range from about −10° C. to about 40° C. Any solvent can be employed if it will not adversely affect the reaction. Thus, dimethylformamide, chloroform, benzene and the like may be utilized. The reaction usually completes within a period ranging from about 2 hours to about 24 hours.

With regard to the removal of protective groups according to method (1), a number of expedient techniques are known which are adapted to different types of protective groups and, for the present purpose, such techniques can be utilized to advantage. Among such techniques is a hydrogenation reaction involving the use of palladium black as a catalyst. Generally, the reaction proceeds satisfactorily at room temperature, but it may be conducted under cooling or slightly heating at a temperature in a range from about 5° C. to about 60° C. Usually, the reaction is carried out in the presence of a suitable solvent, which may for instance be water, methanol, ethanol, dioxane, tetrahydrofuran, acetic acid, t-butyl alcohol or isopropyl alcohol. The reaction is usually completed within a period ranging from about one hour to about 6 hours.

The method (2) comprises reacting a compound of (V) with a compound of the general Formula III. The Compound V can be prepared by reacting aspartic acid with phosgene.

For improved results, the reaction of (V) and (III) is generally carried out under cooling at a temperature ranging from about −70° C. to about 5° C. Any solvent can be employed if it will not adversely affect the reaction. Thus, tetrahydrofuran, dioxane, dimethylformamide, methylene chloride, chloroform, etc., may be mentioned by way of example. The reaction is completed usually within a period from about 1 hour to about 12 hours.

In any of the foregoing processes, the desired product can be recovered from the reaction mixture by, for example, phasic transfer, concentration, chromatography, crystallization, recrystallization and the like.

While the desired compound is usually obtained in its free form, it may be recovered as its physiologically acceptable salt, i.e. the corresponding addition salts with mineral acids such as hydrochloric acid, sulfuric acid, hydroiodic acid, hydrobromic acid, etc., the alkali metal salts with sodium, potassium, lithium, etc., or the alkaline earth metal salts with calcium, magnesium and the like. Therefore, it should be construed that the dipeptide ester of the present invention covers the free form as well as its physiologically acceptable salt.

The dipeptide ester isolated in the free form may be converted into its physiologically acceptable salt by conventional means, for example, by bringing the free dipeptide ester (I) with a mineral acid, an alkali metal hydroxide, an alkali metal carbonate or an alkaline earth metal hydroxide.

According to the above mentioned method, the new peptide esters are produced in good yields and high purities. These compounds have a high degree of sweetness, generally occur as powders which are white, odorless and readily soluble in water; have a quality of sweetness which is refreshing and tasteful; are entirely free from an objectionable after-taste like that of saccharin sodium; and have a quality of sweetness which is comparable to that of sucrose.

It is to be noted that in case where $n$ is 0 in the general Formulas I, III and IV the chemical bond between the carbon atom C* and the hydrogen atom attached to the carbon atom C* very readily undergoes cleavage through the influence of the carboxyl ester groups; when those compound of the Formulas I, III or IV is dissolved in a solvent the hydrogen atom is easily replaced with a hydrogen atom in the solvent; and the replacement gives rise to the racemization. Therefore, in a usual way the carbon atom C* of the Compounds I, III or IV does not show optical activity.

In the following tests, the test compounds represented by the general formula:

$$\begin{array}{ccc}
COOH & & COOR^1 \\
| & & | \\
CH_2 & & (CH_2)_n \\
| & & | \\
H_2N-CH-CONH-\overset{*}{C}H-COOR^2 \\
& (L) &
\end{array}$$

are simply abbreviated in the following manner listed in the following Table 1.

TABLE 1

| $R^1$ | $R^2$ | $n$ | Configuration of the C* atom in above formula | Abbreviation of the compound |
|---|---|---|---|---|
| 1-ethylpropyl | $CH_3$ | 0 | Not fixed | A |
| 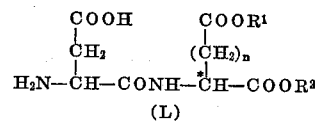 | | | | |
| Cyclopentyl | $CH_3$ | 0 | do | B |
| Cyclohexyl | $CH_3$ | 0 | do | C |

Throughout the specification, milliliter(s), liter(s), gram(s) and kilogram(s) may be referred to as simply ml., l., g. and kg., respectively.

Test 1

Each of the above test compounds was dissolved and diluted with water and the sensory thresholds of the compounds were measured by the maximum dilution technique.

Discriminable concentration in distilled water:

|   | Percent |
|---|---|
| A | 0.0004 |
| B | 0.0003 |
| C | 0.0002 |

Concentration at which the compound tastes sweet:

| | Percent |
|---|---|
| A | 0.0010 |
| B | 0.0008 |
| C | 0.0005 |

Test 2

Aqueous solutions of the test compounds were prepared in concentrations of 0.0125% and 0.025% by weight per volume, respectively. Using those solutions as reference samples and aqueous solutions of sucrose in five different concentrations as matching samples, a sensory test was conducted with a panel of 50 experts and the following equivalent concentrations were obtained by probit analyses.

TABLE 2

| Reference sample | Equivalent concentration of sucrose with respect to reference sample, percent | | |
|---|---|---|---|
| | A | B | C |
| 0.0125 percent | 7.0 | 7.5 | 11.0 |
| 0.025 percent | 9.1 | 12.5 | 13.9 |

TABLE 3

| Reference sample | Time the degree of sweetness of sucrose, times | | |
|---|---|---|---|
| | A | B | C |
| 0.0125 percent | 560 | 600 | 880 |
| 0.025 percent | 364 | 500 | 556 |

The dipeptide ester compounds are found to be nontoxic by the toxicity tests by the oral administration of the dipeptide ester compounds to mice, and the dipeptide ester compounds of the present invention can be used as such or added to foods in the same manner as the conventional sweetener saccharin sodium.

The most effective amount of the dipeptide ester to be employed varies with kinds of foods to be sweetened, but usually about 0.0001% to about 2% by weight relative to the foods served to be eaten. An amount over 2% is superfluous for the increase of sweetness and an amount below about 0.0001% is by itself not sufficient to sweeten foods.

In sweetening foods, the foods to be sweetened by the present invention are incorporated with at least one of the dipeptide ester compounds, and foods having enhanced and good sweetness are produced.

Among the foods to which the present invention is applicable are various powdery, liquid and solid foods in which sweeteners are usually incorporated. For instance, various alcoholic beverages such as wines, refined sake, fermented fruit drinks (including sweet fermented fruit drinks), beer, Western-style alcoholic beverages, etc., non-alcoholic beverages including fruit juices and synthetic juices, fermented milk, instant beverages including instant juices, instant coffee, etc., candied fruits, ice confections, syrups, foods soaked in fruit syrups, soy, unrefined soy, sauces, vinegar, dressings, mayonnaise, ketchup, curry roux, soups, powdered seasonings, powdery soy, rice cakes and other rice confections, bread, Western-style confections, raw rice confections, biscuits, crackers, chocolate, caramel, candies, chewing-gum, jellies, puddings, candied fruits and vegetables, fresh cream, jams, marmalade, flour paste, condensed milk powder, ice cream, sherbert, bottled vegetables, fruits and other products, canned foods, cooked farm products including cooked beans, cooked meats, gourmet foods, cooked delicacies, pickles of farm produces, smoked fish and animal meats, meat products such as hams and sausages, fish pastes, preserved seaurchins and other marine products, pickles and other preparations of fish roes, dried fishes, frozen foods, sea tangle rolls and other preserved and cooked seaweeds. Aside from those varied foods originating from farms and from aquatic, forestal and animal sources, such other products as compound seasonings and condiments, compound sweeteners, such luxury articles as tobacco, drugs and pharmaceutical preparations including dentrifrices and the like may be mentioned by way of example. Thus, insofar as the object of the invention is successfully accomplished, this invention can be applied to any kind of foodstuff.

As regards the mode of incorporation of the present dipeptide esters into foods, any of the procedures routinely employed in the production of foods, such as blending, admixing, dissolution, soaking, impregnation, dusting, spraying, injection, etc., can be utilized.

As regards the timing of addition to foods, the present compounds may be added in the course of production of such foods and, preferably, is at a time towards the end of processing. In other words, they may be added in the same manner as saccharin sodium. For example, in the case of cooked foods such as a curry roux, the compounds are preferably added uniformly at the end of heating or after heating.

The dipeptide ester compounds themselves have strong ability for sweetening foods and it is often difficult to weigh the necessary amount of the dipeptide ester compound to efficiently sweeten foods. Therefore, it is necessary to provide sweetening compositions in which the dipeptide ester compound is appropriately diluted. Such a composition convenient for handy and practical use is prepared by incorporating at least one dipeptide ester compound with a suitable solid carrier or liquid carrier which is known per se as adjuvants.

Such a solid carrier is exemplified by carboxymethylcellulose, glucose, lactose, dextrin, their mixture or the like. The liquid carrier is exemplified by water, ethanol propylene glycol, their mixture or the like.

It is also possible to use the present dipeptide ester compounds in combination with other known additives for foods, e.g. sweeteners (such as sucrose, glucose, sorbitol, saccharin, glycine, alanine, glycyrrhizin, and the like), essences, food colors, and the like. Those additives are to be construed as "carrier" or "adjuvant" in the present invention.

For preparing the composition matter, any of conventional means are employed, and for example, the dipeptide ester compounds are formulated by simple and thorough admixture of the dipeptide compound with the carrier or carriers into solid compositions (e.g. powders, granules and the like), liquid compositions (e.g. solutions, syrups and the like), etc.

The amount of the dipeptide ester relative to the whole composition is usually about 0.1% to about 50% by weight.

This invention will be further illustrated by way of examples. In those examples, the term "part(s) by weight" has the same relationship to the term "part(s) by volume" as do "gram(s)" to "milliliter(s)".

EXAMPLE 1

Production of L-aspartyl-L-aspartic acid α-methyl β-t-butyl diester 2.5 parts by weight of L-aspartic acid α-methyl β-t-butyl diester hydrochloride is suspended in 100 parts by volume of dichloromethane, followed by the addition of 1.54 parts by volume of triethylamine, 3.6 parts by weight of N-benzyloxycarbonyl-L-aspartic acid benzyl ester and 2.3 parts by weight of dicyclohexylcarbodiimide under cooling with ice. The reaction mixture is stirred at room temperature overnight and filtered to remove dicyclohexylurea. The filtrate is washed with 100 parts by volume of a 1 N hydrochloric acid and with 100 parts by volume of a 4 weight percent aqueous sodium bicarbonate solution, and concentrated. The residue is crystallized by the addition of 50 parts by volume of petroleum ether. The crystals are recrystallized from ethyl acetate-petroleum benzin to obtain N-benzyloxy-carbonyl-(β- benzyl)-L-aspartyl-L-aspartic acid α-methyl β-t-butyl diester melting at 76° to 77° C. The yield is 2.6 parts by weight (48%). $[\alpha]_D^{23}=-3.6°$ (C=1.00%, in methanol).

Elementary analysis as $C_{28}H_{34}O_9N_2$: Calcd. (percent): C, 61.98; H, 6.32; N, 5.16. Found (percent): C, 62.13; H, 6.24; N, 5.18.

2.0 parts by weight of N-benzyloxycarbonyl-(β-benzyl)-L-aspartyl-L-aspartic acid α-methyl β-t-butyl diester is dissolved in 50 parts by volume of methanol, followed by the addition of 0.2 part by weight of palladium black. Hydrogen gas is passed vigorously through the mixture under stirring for 4 hours and after the hydrogenation the reaction mixture is filtered. The filtrate is concentrated under reduced pressure at room temperature to obtain L-aspartyl-L-aspartic acid α-methyl β-t-butyl diester as needles melting at 123° to 125° C. $[\alpha]_D^{23}=5.5°$ (C=1.00% in methanol).

Elementary analysis as $C_{13}H_{22}O_7N_2 \cdot \tfrac{1}{2}H_2O$: Calcd. (percent): C, 47.70; H, 7.08; N, 8.56. Found (percent): C, 47.49; H, 7.00; N, 8.50.

EXAMPLE 2

1.6 parts by weight of L-2,5-oxozolidinedione-4-acetic acid is dissolved in 30 parts by volume of methylene chloride. The solution is cooled at −65° C. and is added little by little to a solution of 2.0 parts by weight of L-aspartic acid α-methyl β-t-butyl diester in 20 parts by volume of methylene chloride at −65° C., followed by the addition of 2.80 parts by volume of triethylamine at the same temperature.

The reaction is carried out at −65° C. for 3 hours under stirring, and the reaction mixture is kept at room temperature overnight. The reaction mixture is concentrated under reduced pressure. The residue is dissolved in 5 parts by volume of water and subjected to column chromatography using Sephadex G-10 (trade name of a commercially available dextran gel distributed by Pharmacia, Uppsala, Sweden) as the adsorbent and water as the developing solvent. The effluent portions containing the desired product are combined and concentrated. The residue is crystallized from methanol-ether to obtain 2.1 parts by weight of essentially the same product as in Example 1.

EXAMPLES 3 TO 9

In accordance with the same procedures as in Examples 1 and 2, following compounds formulated below are produced.

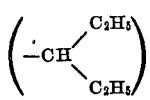

| Example | $R_1$ | $R_2$ | n | Configuration of the above carbon C* | Specific rotation | Melting point (° C.) | Molecular formula |
|---|---|---|---|---|---|---|---|
| 3 | t-Butyl | $CH_3$ | 0 | Not fixed | $[D]_D^{24}=-3.0°$ (C=1.01% in methanol) | 127-128 | $C_{12}H_{20}O_7N_2 \cdot \tfrac{1}{2}H_2O$ |
| 4 | i-Propyl | $CH_3$ | 1 | L | $[\alpha]_D^{24}=-8.5°$ (C=1.01% in methanol) | 108-110 | $C_{12}H_{20}O_7N_2 \cdot H_2O$ |
| 5 | 1-ethyl-propyl $\left(-CH\begin{smallmatrix}C_2H_5\\C_2H_5\end{smallmatrix}\right)$ | $CH_3$ | 0 | Not fixed | $[\alpha]_D^{25}=-2.5°$ (C=1.02% in methanol) | 115-116 | $C_{13}H_{22}O_7N_2 \cdot \tfrac{1}{2}H_2O$ |
| 6 | 1-ethyl-propyl | $CH_3$ | 1 | L | $[\alpha]_D^{25}=+0.6°$ (C=1.02% in methanol) | 62-63 | $C_{14}H_{24}O_7N_2 \cdot H_2O$ |
| 7 | Cyclohexyl | $CH_3$ | 0 | Not fixed | $[\alpha]_D^{21}=+2.1°$ (C=0.66% in methanol) | 80-85 | $C_{14}H_{22}O_7N_2 \cdot 2H_2O$ |
| 8 | Cyclopentyl | $CH_3$ | 0 | do | $[\alpha]_D^{23}=+1.9°$ (C=1.11% in methanol) | 88-91 | $C_{13}H_{20}O_7N_2 \cdot 3/2 H_2O$ |
| 9 | t-Amyl | $CH_3$ | 1 | L | $[D]_D^{24}=-2.8°$ (C=1.03% in methanol) | 88-90 | $C_{14}H_{24}O_7N_2$ |

EXAMPLE 10

A mixture of 30 kg. of concentrated mandarin orange (variety: Unshu) juice, 10 kg. of D-sorbitol powder, 50 g. of citric acid, 20 g. of vitamin C, 100 g. of orange essence and 30 g. of L-aspartyl-aminomalonic acid methyl 1-ethylpropyl diester is evenly dissolved in water to make the whole volume 100 liters, and the solution is pasteurized at about 95° C. for about 20 seconds. The solution is then dispensed into 200 ml. bottles in the routine manner. The orange juice thus prepared has a good quality of sweetness and does not undergo a change in quality on standing at room temperature for one month.

EXAMPLE 11

Chocolate is produced in the routine manner from 23 kg. of cacao paste, 17 kg. of cacao butter, 25 kg. of sucrose, 8 kg. of D-sorbitol, 18 kg. of whole milk powder, 0.5 kg. of sucrose stearic acid ester, 1.0 kg. of milk essence, 0.5 kg. of strawberry essence and 0.1 kg. of L-aspartyl-aminomalonic acid ethyl cyclohexyl diester. This product has a delicious taste, and its sweetness is in harmony with its flavor.

EXAMPLE 12

A sweetening composition (powder) is prepared by evenly blending in the conventional manner, 50 kg. of glucose, 20 kg. of D-sorbitol and 30 kg. of L-aspartyl-L-aspartic acid α-methyl β-1-ethylpropyl diester. This product is ten times as sweet as sucrose and its quality of sweetness is excellent.

What is claimed is:
1. A dipeptide ester represented by the formula:

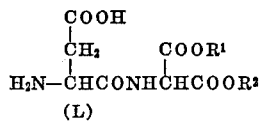
(L)

wherein $R^1$ is a branched or cyclic alkyl group of 3 to 8 carbon atoms and $R^2$ is a lower alkyl group of 1 to 2 carbon atoms.

2. A dipeptide ester according to claim 1, wherein $R^1$ is t-butyl and $R^2$ is methyl.

3. A dipeptide ester according to claim 1 wherein $R^1$ is 1-ethylpropyl and $R^2$ is methyl.

4. A dipeptide ester according to claim 1 wherein $R^1$ is cyclohexyl and $R^2$ is methyl.

5. A dipeptide ester according to claim 1 wherein $R^1$ is cyclopentyl and $R^2$ is methyl.

References Cited

UNITED STATES PATENTS

| | | | |
|---|---|---|---|
| 3,475,403 | 10/1969 | Mazur et al. | 260—112.5 |
| 3,492,131 | 1/1970 | Schlatter | 260—112.5 |
| 3,678,026 | 7/1972 | Ariyoshi et al. | 260—112.5 |
| 3,695,898 | 10/1972 | Hill et al. | 260—112.5 |

OTHER REFERENCES

Mazur et al., J. Am. Chem. Soc., 91, 2684 (1969).
Bodanszky, M. and Ondetti, M., "Peptide Synthesis," Interscience Pub., New York, pp. 94–95 (1966).

LEWIS GOTTS, Primary Examiner
R. J. SUYAT, Assistant Examiner

U.S. Cl. X.R.
99—141 A